PRODUCTION OF METAL OXIDES

Original Filed March 14, 1958 5 Sheets-Sheet 1

INVENTORS
WILLIAM HUGHES and
ARTHUR WALLACE EVANS
Oscar Spencer
ATTORNEY

PRODUCTION OF METAL OXIDES

Original Filed March 14, 1958 5 Sheets-Sheet 2

INVENTORS
WILLIAM HUGHES and
ARTHUR WALLACE EVANS
Oscar A. Spencer
ATTORNEY

INVENTORS
WILLIAM HUGHES and
ARTHUR WALLACE EVANS
Oscar L. Spencer
ATTORNEY

PRODUCTION OF METAL OXIDES

Original Filed March 14, 1958 5 Sheets-Sheet 4

INVENTORS
WILLIAM HUGHES and
ARTHUR WALLACE EVANS
Oscar A. Spencer
ATTORNEY

INVENTORS
WILLIAM HUGHES and
ARTHUR WALLACE EVANS

Oscar A. Spencer
ATTORNEY

United States Patent Office

Re. 25,864
Reissued Sept. 21, 1965

25,864

PRODUCTION OF METAL OXIDES

William Hughes, Stockton-on-Tees, and Arthur Wallace Evans, Middlesbrough, England, assignors to British Titan Products Company Limited, Durham, England, a corporation of England Original No. 3,043,657, dated July 10, 1962, Ser. No. 721,579, Mar. 14, 1958. Application for reissue Feb. 8, 1965, Ser. No. 448,905
Claims priority, application Great Britain Aug. 6, 1953
17 Claims. (Cl. 23—142)

Matter enclosed in heavy brackets [ ] appears in the original patent but forms no part of this reissue specification; matter printed in italics indicates the additions made by reissue.

This present application is a continuation-in-part of application Serial No. 447,648, filed August 3, 1954, entitled "The Preparation of Metallic Oxides," now Patent No. 2,828,187, dated March 25, 1958. It is also a continuation-in-part of application Serial No. 598,913, filed July 19, 1956, entitled "Production of Silicon Dioxide," now abandoned. It is also a continuation-in-part of application Serial No. 720,470, filed March 10, 1958, entitled "Production of Silicon Dioxide," *now Patent 3,043,659, dated July 10, 1962.*

This invention is for improvements in or relating to the preparation of metallic oxides, more particularly the oxides of [metals] *titanium, silicon, and aluminium* having [halides] *chlorides* which exist in vapor form at temperatures below 350° C. at atmospheric pressure. Particular examples of such metallic oxides are titanium dioxide, silicon dioxide and aluminium trioxide.

Processes for the production of finely divided oxides, especially titanium dioxide and silicon dioxide, have been suggested in which the corresponding vaporized halide, particularly the chloride, is converted to the oxide by various procedures involving oxidation or hydrolysis at elevated temperatures.

These processes, though varying considerably in detail, all require the use of burners or jet assemblies for feeding the reactant gases and vapors to the reaction space. The apparatus is often further complicated by the need to maintain the reaction temperature and, in some cases, to provide the moisture for the hydrolysis reaction by the simultaneous combustion of hydrogen, hydrocarbons or other vaporized fuels. In these processes it is rarely possible to increase the production of the apparatus by an increase in the size of the jets or burners as this usually leads to a deterioration in the quality of the product. Consequently, for large scale production it is necessary to use a large number of similar jets or burners.

It is an object of the present invention to provide a process for the manufacture of metallic oxides as aforesaid which is highly efficient and in which the reaction temperature can be readily controlled, and which is more adaptable for large scale operation.

It is a further object of the invention to provide a process for the manufacture of metallic oxides as aforesaid from the corresponding [halides, particularly the corresponding] chlorides, which obviates or minimizes the disadvantages of prior art processes.

A still further object of the invention is the production of metallic oxides as aforesaid by continuous methods utilizing fluidized beds carried out in large scale reactors under self-sustaining conditions where no heat need be supplied to maintain the reaction, i.e. the action being carried out under autothermal conditions.

Other objects include the utilization of reaction conditions according to which the gaseous and vaporized reactants are delivered to the reaction zone under conditions ensuring maintained uniform conditions while the relative proportions of the reactants are controlled as desired.

Still further objects and advantages will appear from the more detailed description given below, it being understood that such more detailed disclosure is given by way of explanation and illustration only and not by way of limitation, since various changes therein may be made by those skilled in the art without departing from the scope and spirit of the present invention.

It has been shown in said applications that metal [halides] *chlorides,* more particularly titanium tetrachloride and silicon tetrachloride, may be oxidized by establishing a fluidized bed of inert solid particulate material, maintaining the temperature of said bed sufficiently high to cause the metal [halide] *chloride* to react with oxygen while introducing the metal [halide] *chloride* and oxygen into said bed, whereby the metal oxide is formed, and carrying the metal oxide thus produced away with the gases leaving the fluidized bed.

The particulate inert solid material constituting the bed in which the reaction is to take place may be selected from sand-like materials, i.e. silica, zircon, mineral rutile, alumina or massive mineral rock materials which are resistant to chlorine or chlorine-containing substances likely to be present in the course of the oxidation reaction described and at the temperatures encountered, and may, if necessary, have been treated with chlorine at high temperatures in order to remove any undesirable impurities which might otherwise be attacked during the oxidation reaction and thereby contaminate the product. The sand-like material is preferably substantially entirely composed of particles not less than 76 microns in diameter and normally not greater than about one-eighth of an inch in size. The particle size of material should, in any case, be not less that 40$\mu$, preferably 80$\mu$, and not substantially greater than 1000$\mu$ diameter. By carefully grading the bed material in respect to the sizes of the particles thereof it is possible to control, within limits, the progress of the reaction within the bed.

Zircon sand of mean particles size 150$\mu$ is the substrate material of choice for use especially in the preparation of titanium dioxide by reason of its relative hardness and because it resists attack by the by-product, chlorine, liberated in the oxidation reaction. It will be appreciated that the term "massive mineral" relates to minerals which are of such compact nature that the density of each particle thereof approximates the density of a substantially perfect specimen of the material. The material comprising the fluidized bed should be such that it would fluidize in an air stream at a temperature of 1000° C. for 100 hours at a velocity five times the minimum fluidizing velocity, and the amount of dust and fine material carried away in suspension in the emerging air stream would not exceed 5 percent (preferably one percent or below) of the material originally present in the bed.

The metal [halides] *chlorides* react with oxygen within the bed to form the appropriate metal oxide and halogen. For instance titanium tetrachloride reacts with oxygen according to the following equation:

$$TiCl_4+O_2=TiO_2+2Cl_2$$

Silicon tetrachloride reacts with oxygen according to the following equation:

$$SiCl_4+O_2=SiO_2+2Cl_2$$

and aluminium trichloride according to the following equation:

$$4AlCl_3+3O_2=2Al_2O_3+6Cl_2$$

Thus it will be seen that the formation of the metal oxides does not result from a hydrolytic reaction, such as has been the case in many previous vapor-phase oxidation processes, and this results in the formation of chlorine, rather than hydrochloric acid, which latter has various disadvantages.

The molar ratio of oxygen to the chlorides of tetravalent metals is preferably within the range 1:1 to 2:1. Higher proportions of oxygen, e.g., up to 5:1, may be used, but, especially when using titanium tetrachloride or silicon tetrachloride, complete reaction of the metal [halide] *chloride* is generally achieved within the preferred range. Molar ranges less than 1:1 obviously give incomplete oxidation of the [halides] *chlorides* of tetravalent metals. When using a [halide] *chloride* of a metal which is not tetravalent, the suitable molar proportions of reactants will clearly be different. For instance, in the case of aluminium trichloride complete reaction of the trichloride will not be achieved unless a minimum oxygen to aluminium trichloride molar ratio of 3:4 is used.

The reactants may be used in a relatively dry condition, or, for control in the reaction, a little moisture may be tolerated, particularly in the oxygen stream. It will be appreciated that the presence of more than a little moisture is desirably to be avoided, since, [for instance] when the [halide] starting material is a chloride, the presence of moisture may convert the chlorine produced to hydrochloric acid. The latter is generally detrimental to the process, in that hydrochloric acid cannot so readily be re-used for the purpose of chlorination, as normally conducted in accordance with the preferred process of this invention. On the other hand, the chlorine produced can conveniently be utilized for the production of further supplies of metal [halides] *chlorides* by chlorination of metalliferous materials.

When chlorinating titaniferous materials to obtain titanium tetrachloride, the reaction is highly exothermic and it is essential to employ a means of indirect cooling of the reaction products, which, in effect, normally means the use of metal and hence poses the problem of corrosion. The presence of hydrogen chloride aggravates this problem. Since it is not in practice possible to operate a commercial process for chlorinating titaniferous materials with hydrogen chloride, it will be realized that any conversion of chlorine into hydrogen chloride represents a loss of chlorine to the system. When chlorinating ferrosilicon to obtain silicon tetrachloride, the reaction, whether hydrogen chloride or chlorine is used, is highly exothermic and it is again essential to employ in conjunction therewith a means of indirect cooling, with the attendant disadvantages already mentioned. Furthermore, in the chlorination of ferrosilicon with hydrogen chloride, hydrogen is formed and this entails the necessity of separation from the silicon tetrachloride vapour and involves certain additional safety precautions. Where the source of silicon tetrachloride is native silica, it is still more desirable that chlorine be used for chlorination, rather than hydrochloric acid.

The temperature of the fluidized bed should be maintained within the range of 500° to 1300° C., preferably 900° C. to 1100° C., the range of 1000° C. to 1050° C. giving especially good results. The reaction is exothermic and the bed of solid inert particles acts as a heat reservoir. With a well-insulated furnace, the heat generated by the reaction may suffice to maintain the reaction without supplying auxiliary heat. However, according to the disclosure in the aforesaid patent applications, it is generally required that additional heat should be applied, for instance by external heating means, by admitting one or both reactants into the bed in a heated state, or by admitting a combustible gas to the bed so as to burn with gaseous oxygen and supply the required additional heat.

The apparatus more particularly described in the aforesaid patent applications is very useful when it is desired to carry out oxidation of metal [halides] *chlorides* on a very small scale. However, when it is desired to carry out the operation on a large scale, the use of external heating should be avoided since, owing to the corrosive nature of the metal [halides] *chlorides* and of the reaction products, the furnace is likely to be constructed of ceramic nonconductive material, and so external heating is not only uneconomic but is also difficult to control in the sense that the temperature conditions over a large reactor tend to be irregular, and this brings about variations in the product. An important advantage of the present invention is that it makes possible the autothermal oxidation of metal [halides] *chlorides* on a large scale and so avoids the necessity of external heating, and the consequent variations in the product.

As has been indicated above, it is important to minimize variations in the product, and it is in consequence desirable to distribute the reactant gases uniformly over the cross-section of the reactor furnace. This problem is not of such great importance in small-scale reactors. With large-scale reactors, the problem arises of obtaining uniform conditions of fluidization and proper intermingling and distribution of the reactants and the present invention solves this problem.

It has now been found that a particularly advantageous method of operation comprises reacting the vapor of a [metal halide] *chloride of titanium, silicon, or aluminium* with oxygen in the course of their upward passage through a fluidized bed of inert solid material so that the metal oxide which is produced is at least for the most part discharged from above the bed entrained in outgoing gases, characterized by the following features:

(a) That the reactants are heated in the bed to the extent required to cause them to react so that external preheating is not required;

(b) That the bed, adequately insulated, contains a sufficient quantity of the inert solid material to conserve from the heat of the exothermic reaction what is necessary to effect continuously said heating of the reactants which are, or at least one of which is, being introduced so rapidly as to fluidize the bed in the desired manner;

(c) That the reactants are introduced into the bed through a plurality of inlet ducts distributed and mutually arranged with respect to the horizontal cross-sectional area of the bed so as to enable uniform fluidization of the bed. The reactants may be pre-mixed but it is preferred to introduce them separately into the bed through respective inlet ducts distributed and arranged as aforesaid and so as to ensure the intermingling of the respective reactants required for their inter-reaction to take place within the bed;

(d) That the inlet ducts for the reactants are provided with constrictions of predetermined dimensions to ensure that a supply under pressure of the reactants, in their required proportions is appropriately distributed among the inlet ducts appertaining thereto; and (e) That each constriction in an inlet duct produces a pressure drop from the pressure of the supply of reactant thereto which is at least one half of the pressure drop from the bottom to the top of the fluidized bed.

As regards (a) above it will be understood that external preheating of the reactants is not completely precluded because, in the first place, the metal [halide] *chloride* will be preheated at least to the extent of vaporizing it and, in the second place, there is no disadvantage, if convenient to do so, to use oxygen which is preheated to a moderately raised temperature. In fact it is desirable to preheat the oxygen at least to the extent necessary to prevent condensation of the metal [halide] *chloride* vapor, e.g. to a temperature of 50 to 100° C., the precise temperature depending on the particular metal [halide] *chloride* used.

As regards (b) above it is obvious that the size of the cross-sectional area of the bed is a more important factor than height of the bed because increase of height to accommodate the required amount of bed material would unduly increase heat losses apart from requiring larger fluidizing forces. Therefore, to achieve the desired autothermal operation of the process there is a minimum size for the cross-sectional area of the bed and we estimate that this means, assuming a cylindrical reaction chamber, that the diameter of the bed must be at least fifteen inches. It may of course be larger but it should be borne in mind, that in designing for substantially larger diameters, the conserved heat may exceed what is required to maintain the reaction and that provision for cooling of the reaction zone should therefore be made.

The fluidized bed employed may be as described hereinbefore as to bed materials, particle size, and like details, except that, as has already been specified, there should be sufficient inert solid material to conserve from the heat of the exothermic reaction at least what is necessary to maintain continuance of the reaction.

As has already been mentioned,, the gaseous reactants are continuously introduced into the inert hot bed through a plurality of inlet ducts to maintain uniformity of reaction throughout the bed. The velocity of the gas maintaining the bed in the fluidized state is desirably between two and fifty times the minimum required for fluidization, and preferably between three and ten times such minimum. For this purpose, the inlet ducts are provided with the above-mentioned constrictions, the size of which is so chosen that with the necessary rate of gas-flow the pressure-drop across the constrictions is at least one-half, and desirably less than fifty times, the pressure-drop of the gas in passing through the bed, thus affording a substantially even flow of the gaseous reactants over the whole of the bed material.

The pressure drop across the constrictions will generally exceed 2 lbs. per square inch, and the total pressure drop across the constrictions and the bed will generally be above 3 lbs. per square inch but rarely over 100 lbs. per square inch.

The temperature of the reactor, when of internal diameter considerably greater than fifteen inches (say eighteen inches or greater) may be controlled, in the sense of being kept down as necessary, by the use of gaseous coolants as exemplified by chlorine, nitrogen, carbon dioxide or cooled recycled tail gases which may be introduced directly into the fluidized bed, or by liquid chlorine injected into or sprayed upon the bed. In addition, or alternatively, the temperautre of the reactor may be controlled by introducing, progressively, relatively cool sand or other inert bed material into the bed, and correspondingly discharging hot sand from the bed.

Under the temperature conditions hereinbefore specified, other general control factors may be varied to maintain the conditions desired. Thus the oxygen gas and metal [halide] *chloride* vapor will usually be fed to the reactor at a velocity (assuming the reactor to be empty) of from about one-quarter to about two feet per second, or higher. Where bed material is progressively fed into and out of the reactor, the rate of feed may vary, as illustrated in the examples. But any conditions used must be balanced for autothermal operation. In general, it may be noted that in any given installation the insulation is fixed, and the oxygen and metal [halide] *chloride* feed is determined at least in part by the amounts required to maintain fluidization. Under these circumstances the temperature will usually be kept down within the desired range by feed of extraneous coolant or of bed material as mentioned above.

In a preferred embodiment, the reactor is essentially a vertical shaft, usually cylindrical, and lined internally with chlorine-resisting brickwork which, in turn, is protected by an outer shell of insulating brick, the whole being contained within a steel shell, the latter terminated at the top and the bottom with openings corresponding to the shaft on which are constructed extension pieces which are flanged to take a header in the case of the top and a hearth unit to be attached to the bottom. The latter unit desirably consists of a steel plate, surmounted by a heat-insulating block sealed thereto and itself surmounting gas-inlet and gas-supply means. The steel plate contains a number of apertures spaced uniformly according to a predetermined plan in order to provide for the admission of the reactants, and the insulating block contains a number of bores, in which refractory tubes may be fitted, to provide passages registering with the apertures. The apertures in the plate are fitted with gas-inlet means having constrictions of predetermined size. The passages through the insulating block may optionally be provided at their upper ends with devices designed to prevent solids from falling down therethrough but to permit the flow of gas upwards. Said block functions essentionally to insulate from the heat of the reactor the metal plate and the gas inlet means and gas-supply devices positioned below. The whole hearth unit assembly is constructed so as to fit into the base of the furnace shaft so that the metal plate supporting the structure may be attached to the lower flanged end of the steel shell of the furnace.

One set of the inlet means is designed for the admission of metal [halide] *chloride* and another set, appropriately neighbored with the first mentioned set, for the admission of the oxygen. The inlet means for metal [halide] *chloride* into the appropriate passages may be connected to one or more manifolds or to a windbox, and the inlet means feeding the oxygen may similarly be connected to a separate manifold, or manifolds, or windbox. In either case, it will be clear that the gas-inlet means, preferably welded on to or into the metal plate, will be of such length and so fabricated that they may be conveniently connected to link with the respective manifolds or windboxes. With a windbox construction, there may be a plug containing the above-mentioned constriction at the point of entry to each inlet means. In the case where a manifold is used, each inlet means may comprise a pipe with a flanged end connected with a corresponding flanged end of a pipe leading from the manifold, the constriction being present as an orifice in a disc held between the two flanged ends.

A preferred feature is that there should be an admission of the oxygen reactant round the walls of the reactor, so far as possible, in order to avoid undue reaction at the static surface provided by the wall, as opposed to the dynamic surface provided by the fluidized particles.

Although it is desired to incorporate as large as possible a number of gas ports into the base of the reactor, there should not be so many ports as will weaken the base of the reactor. It is also of course desirable to make the hearth unit at the base of the reactor as insulating as possible so as to retain the heat of reaction within the furnace.

An essential feature according to this preferred and particularly advantageous method of operating the invention is the use of constrictions of predetermined dimensions in the inlet ducts for the reactants. These constrictions are an important controlling factor in the system of gas distribution, and the dimensions are determined having regard to the fluidization required, the properties, i.e., the density and viscosity, of the reactant gas, and the amount of gas which it is desired to admit taking into account the number of inlet ducts available. It will be appreciated that the constrictions for the different reactants may be of different dimensions.

The header plate which is secured to the flanged end at the top of the steel shell of the furnace may be constructed with two openings, one for the temporary insertion of a poker or other suitable device to effect initial heating of the furnace and also for admission of the material forming the bed, and the other for conveying the products of reaction from the furnace to suitable cooling, collecting and/or separating devices to be described hereinafter.

With the hearth unit affixed, any one of the above-mentioned particulate solid inert materials, or a mixture of such materials, is fed into the furnace to a static depth desirably of approximately 1–3 feet. It may be more but this is usually unnecessary. The bed thus formed is then fluidized by a stream of air fed through the inlets at the base of the reactor, and a pre-ignited gas poker may be inserted into the bed. In this way, the furnace may be raised to a temperature of say approximately 1000° C., whereupon the gas poker is removed, and the inlet through which it was injected suitably sealed. At this stage the air-stream is shut off and oxygen, or a gas rich in oxygen, is passed into the furnace through the appropriate inlets. The metal [halide] *chloride* ductings, inlets and passages are, to start with, swept with a stream of nitrogen, and then the metal [halide] *chloride* is passed therethrough, whereupon reaction takes place substantially entirely within the bed. The metal oxide thus produced is carried up out of the bed entrained with the chlorine-containing product gases, and is desirably led from the furnace through the ducting in the header to suitable cooling, collecting and/or separating devices described later herein, which may be of various types.

The metal oxide produced by the reaction is in a finely-divided state and is carried forward from the bed entrained as a suspension in the chlorine-containing product gases. The temperature of this mixture as it leaves the bed is in the neighborhood of 900–1200° C., normally varying within the range of 800–1250° C. As the gases are corrosive it becomes necessary to effect cooling whilst they are still contained within apparatus lined with chlorine-resistant material until they are sufficiently cooled to permit cooling in metal or other conduits which are more highly heat-conductive. Various methods of effecting this cooling may be used depending on the particular oxide concerned, such as by quenching with water or by recirculation of cool gases. The gases which are cooled preferably to at least 400°C. are thereafter led through well-known cooling devices prior to collection and/or separation of the metal oxide from the gases. The separated metal oxide may then be purified in any suitable manner for the removal of chlorine.

While as indicated, substantially all the metal oxide produced is carried forward entrained within the product gases, a small proportion of the metal oxide may adhere to the substrate material comprising the bed. Where the accumulation, after a period of time, becomes excessive, it may be necessary to discharge the bed completely and replace it, unless as hereinbefore mentioned, the bed is progressively renovated.

In either case the metal oxide accretations on the bed material may, if desired, be removed by a separate procedure involving chlorination by methods which are themselves well-known in the art. It will be realized that in some cases, notably in the preparation of silicon dioxide, the expense of such chlorination, or other recovery procedure, may not render the procedure worthwhile commercially. Such material, after this cleansing and following appropriate cooling, may then be returned to the oxidation chamber for use in cooling and/or renovating the bed as mentioned above, and more fully described hereinafter. When preparing titanium dioxide, it has generally been found unnecessary to renew the bed material unless and until it has a content by weight of at least 20% titanium dioxide deposited thereon; it will be understood that the higher the titanium dioxide content the more economical is the recovery of the titanium dioxide from the bed material prior to its return to the system. On the other hand, the accretion of metal oxide on to the bed material should not be allowed to increase to such an extent that the fluidization of the bed is unduly hindered.

It has already been demonstrated that the heat evolved by the oxidation reaction is utilized to maintain the temperature and is adequate to do so. Thus the chamber should be well insulated and the rate of heat lost to the surroundings should not be greater than the rate at which the heat is evolved. It follows, therefore, that for the process to be autothermal, the reaction chamber will require to be adequately fabricated for this purpose, both in regard to size and materials of construction. As has already been stated, it has been found in practice when using well-known materials of construction, that a minimum internal diameter of a cylindrical shaft furnace is about 15 inches. In employing a furnace of 15 inches in diameter it is possible to maintain the temperature by minor controls such as by slight variations in the rate of feed of the reactants. When, however, furnaces of larger construction are employed, it is desirable, rather than to employ constructional material giving less insulation, to introduce into the bed cooling agents, as already indicated, whereby the temperature of reaction is kept down as required.

In a preferred embodiment, fully described hereinafter, cooling is effected and the temperature of reaction controlled by continuously feeding cool solid inert fluidizable material to the bed to replace a corresponding amount of hot material which is continuously discharged. The amount of discharge and replacement will depend on the temperature of the replacement material at the time of feeding and the amount of heat to be removed. Thus to get the maximum heat removal with a minimum amount of discharge and replacement, cold replacement material can be used. In the event, however, of it being desirable at the same time to increase the purge in the bed, the replacement material may be fed in at an elevated temperature so as to obtain the same cooling effect with a larger feed and in consequence a greater purge. It will be appreciated that there may be two requirements (a) to cool the bed, and (b) to purge the bed, and by varying the temperature of the replacement material there is a freedom of action in respect of the quantity thereof to be admitted. By such means, the bed may be progressively renovated, thus overcoming the possible drawback associated with accretion of metal oxide on the bed particles.

Preferred equipment which may be used for the invention is more particularly described with reference to the accompanying drawings, to some extent diagrammatic, in which.

Figures 1, 2:
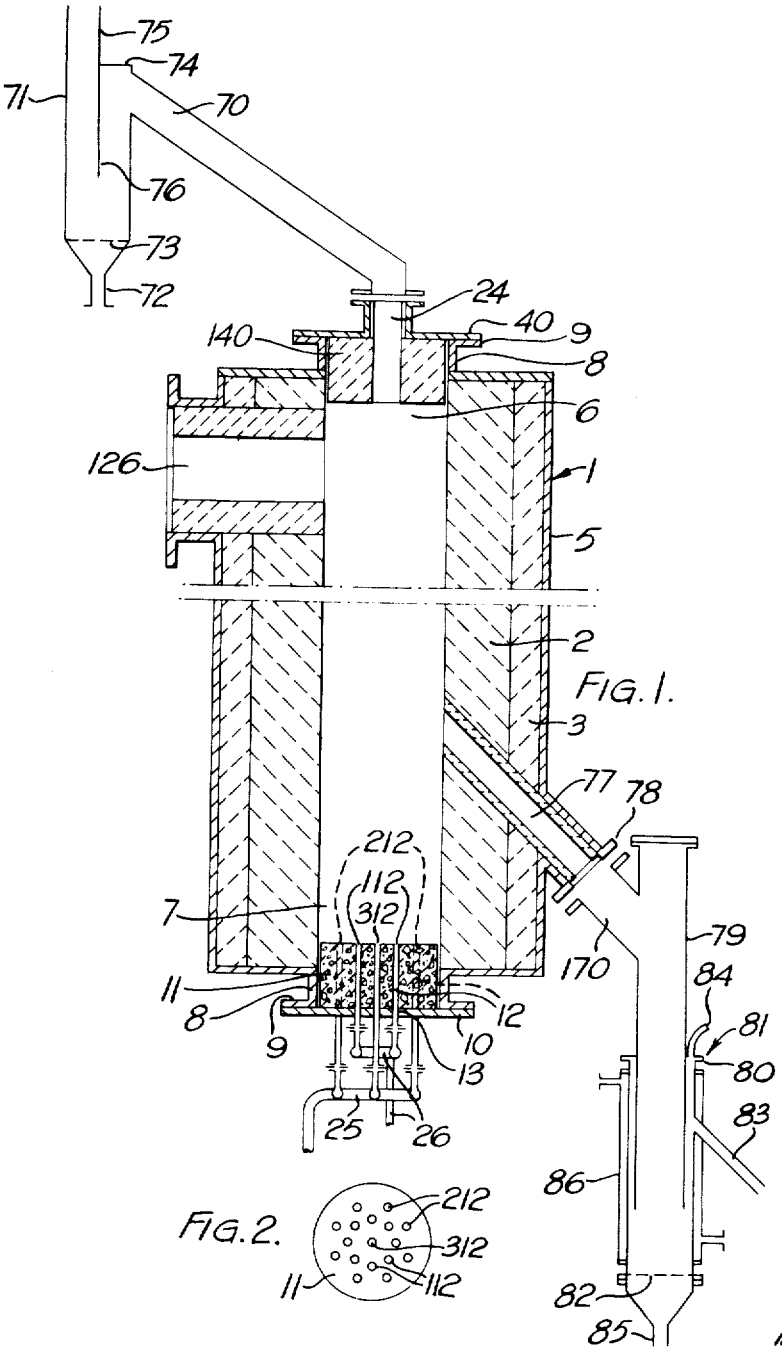
FIGURE 1 shows in vertical sectional elevation a shaft furnace chamber, a solids-feeding device and a solids-collecting and cooling device.
FIGURE 2 is a plan view of a detail of FIGURE 1.

In FIGURE 1 there is shown by the general reference numeral 1 a furnace chamber lined with chlorine-resisting brickwork 2 supported and lined on the outside with insulating brickwork 3, the whole being contained in a steel shell 5 which has openings at the top 6 and bottom 7. On to these openings are welded short collars 8, terminating in flanges 9, the whole being mounted by means not shown, so that furnace 1 stands vertically.

A metal base plate 10 has surmounting it a ceramic block 11 constructed so that when the base plate 10 is inserted into the bottom opening 7 of the furnace 1, it will neatly fit whereby the block 11 serves to insulate from the shaft of the furnace 1 the base plate 10 below. The base plate contains apertures 13 registering with bores 12 in the block 11, the apertures 13 and bores 12 being distributed over the plate 10 and block 11 in a design which is shown in plan view in FIGURE 2.

In this particular and somewhat simplified design, the bores 12 are subdivided into (1) a set of passages 112 for admission of the metal [halide] *chloride,* the passages 112 being arranged in the form of an octagon, i.e. there being eight passages surrounding the centre of the block 11, and (2) a set of passages 212 and 312 for admission of oxygen, these latter passages being arranged in the form of an outer octagon of passages 212 and an additional passage 312 in the centre of the block 11, the apertures 13 registering with the passages 112, 212 and 312, as has already been indicated.

The upper parts of the bores in the ceramic block 11 may be fitted with gas-emergent means designed positively to bar ingress of the bed material, and yet to permit the passage of the reactant gases, but it is preferred to operate without the use of such devices, and have passages 12 of limited diameter such that the reactants may be fed with [sufficiently] *sufficient* velocity to prevent solid body material from falling back into the passages. Thus FIGURE 1 shows passages 12 without any such devices.

FIGURE 1 shows an arrangement in which the passages 12 are fed with reactants from a manifold system. A similar system is also shown in more detail in FIGURE 3, although in the latter figure, solids non-return devices in the form of porous caps are shown in the upper portions 15 of the passages 12.

One manifold 25 distributes oxygen to passages 212 and 312, while another manifold 26 distributes metal [halide] *chloride* vapor to passage 112. All the passages 12 communicate with pipes 41 which are welded to the plate 10 and are fitted with flanges 104 (see FIGURE 3) at their lower extremities. To each flange 104 is secured a flange 105 on a pipe 42 leading to the manifolds 25 and 26, respectively, for oxygen and metal [halide] *chloride,* a constriction being provided by a machined orifice 47 present in a disc 43 being held between the flanges 104 and 105.

Figure 3:
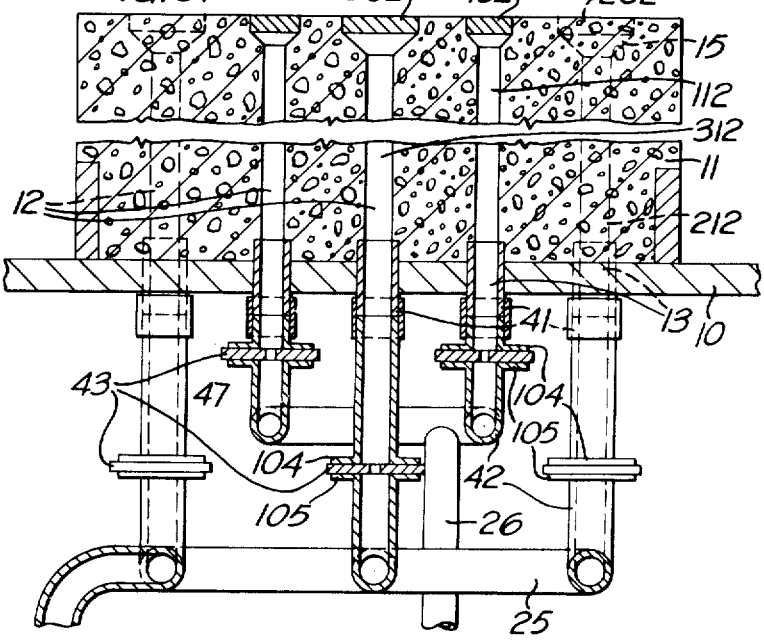
FIGURE 3 is an enlargement in vertical elevation of a detail of FIGURE 1 slightly modified.
Figure 4:
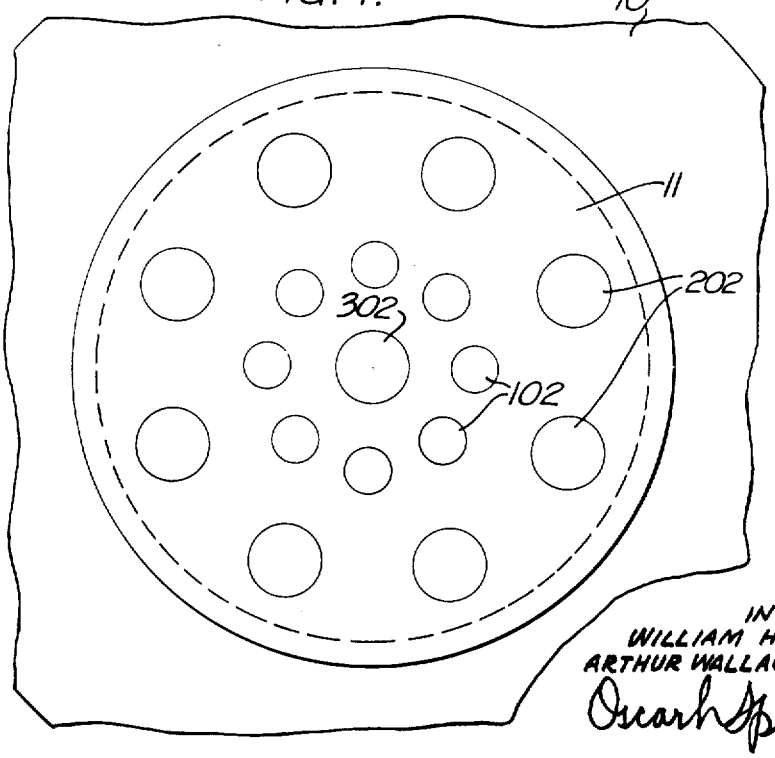
FIGURE 4 is a top plan view from above of FIGURE 3.

FIGURE 3 also shows the provision of gas-permeable solids-impermeable devices 102, 202, and 302, in the upper portions of the passages 12, the latter being flared so as to accommodate the devies which prevent solids from falling into the passages and the gas-feeding systems, while allowing the gas to escape therethrough. It will be seen that the devices 202 and 302 in the oxygen inlet passages 212 and 312, respectively, are of larger size than the devices 102 in the metal [halide] *chloride* passages 112. Instead of these devices, other types may be used, but it is preferred to rely merely on the force of the fluidizing gases to prevent solid material from falling into the feed system.

Figure 5:
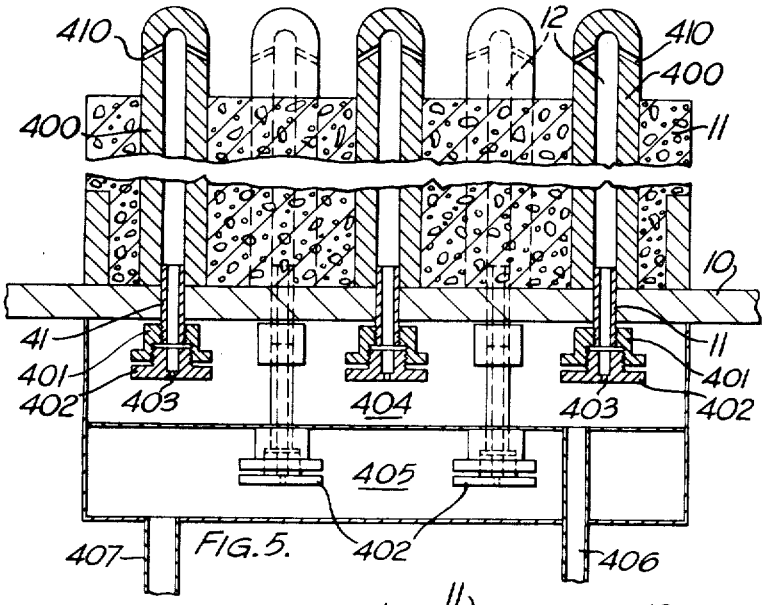
FIGURE 5 shows an enlargement in vertical sectional elevation of a modified detail of FIGURE 1.
Figure 6:
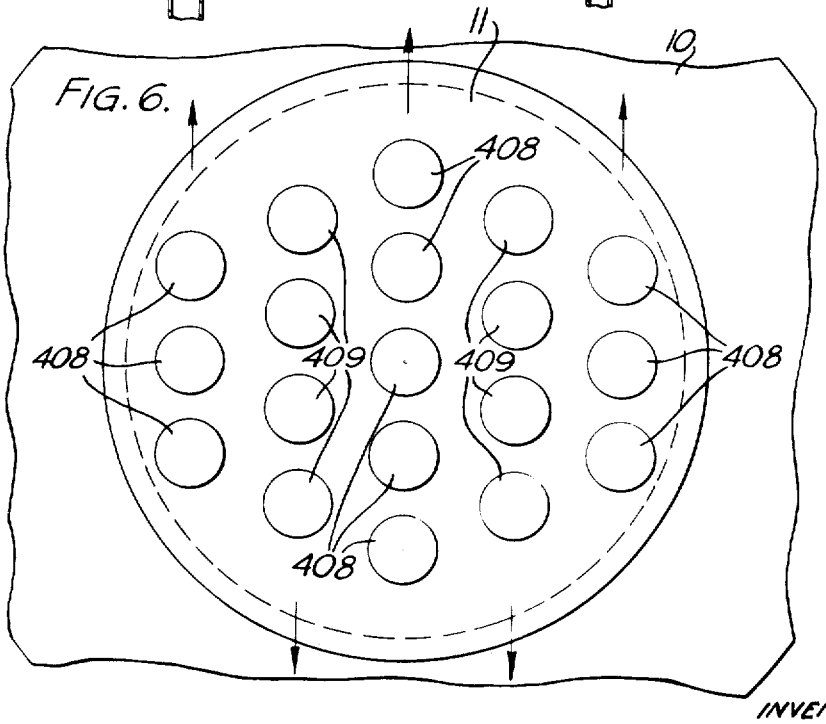
FIGURE 6 is a top plan view of FIGURE 5.

A further modification is shown in FIGURES 5 and 6 where refractory tubes 400 made for example of an alumino silicate are fitted in the bores in the insulating block 11, and have outlets to the furnace in their tops as shown at 410. Pipes 41 welded to the plate 10 pass through the apertures therein and extend into the tubes 400. Sockets 401 are secured on the lower ends of the pipes 41 and these receive screw plugs 402 having orifice constrictions 403. It will be noted that certain of the pipes are coupled to downward extension pipes and that these have the sockets and plugs at their ends. The plugs of the pipes which are not extended downwards are open to a windbox 404 whilst those of the extended pipes are open to a windbox 405.

Windbox 404 is adapted to receive an oxygen supply through inlet 406, and windbox 405 to receive a metal [halide] *chloride* supply through inlet 407. It will be seen from the plan view of FIGURE 6 that the tubular passageways to the furnace for the oxygen are in groups 408 whilst those for the metal [halide] *chloride* are in intermediate groups 409. Although a windbox supply with orificed plugs is shown in FIGURE 5, it will be appreciated that manifolds, and constrictions formed in orificed discs, may be used instead. In fact the pattern of distribution of the respective inlet means shown in FIGURE 6 lends itself conveniently to a supply from manifolds because the latter can be straight, corresponding to the straight dispositions of the passageways for the oxygen and metal [halide] *chloride* as seen in FIGURE 6. In that case the manifolds for the oxygen and metal [halide] *chloride* may be supplied in opposite directions from manifolds, as indicated by the arrows.

Reverting to FIGURE 1, the top 6 of the furnace is covered by a closure 40, which is affixed to the upper flange 9 and which surmounts a block 140 of insulating ceramic material. This closure is formed to provide a port 24 for feeding in the solid bed material which subsequently constitutes the bed in operation. The solid bed material is fed from a solids-feed device 71 which is shown diagrammatically in FIGURE 1. The solids-feed device consists of a 5 ft. length of steel tube, 6″ in internal diameter, with a tapered bottom to which is sealed flange pipe 72, 2″ in diameter, communicating with a source of compressed air. Above the taper at 73 is affixed a perforated plate, carrying holes 1/16″ in diameter and spaced at half-inch intervals to form a square pattern. The upper portion of the tubing is bisected over a length of 3 feet and the top of the lower portion thereof is sealed with a horizontal steel cover 74. An inclined flanged pipe 70, 2″ in diameter, leads directly to the furnace 1 from the lower part of the feed device at a point just below the cover. A flat steel strip 75 is sealed on to the bisected length of tubing, said strip projecting downwards at 76 to about 6″ from the base of the tube, measured from 73; the purpose of this projection being to prevent or minimize the effects of any back-flow of gases from the reactor.

Figure 7:
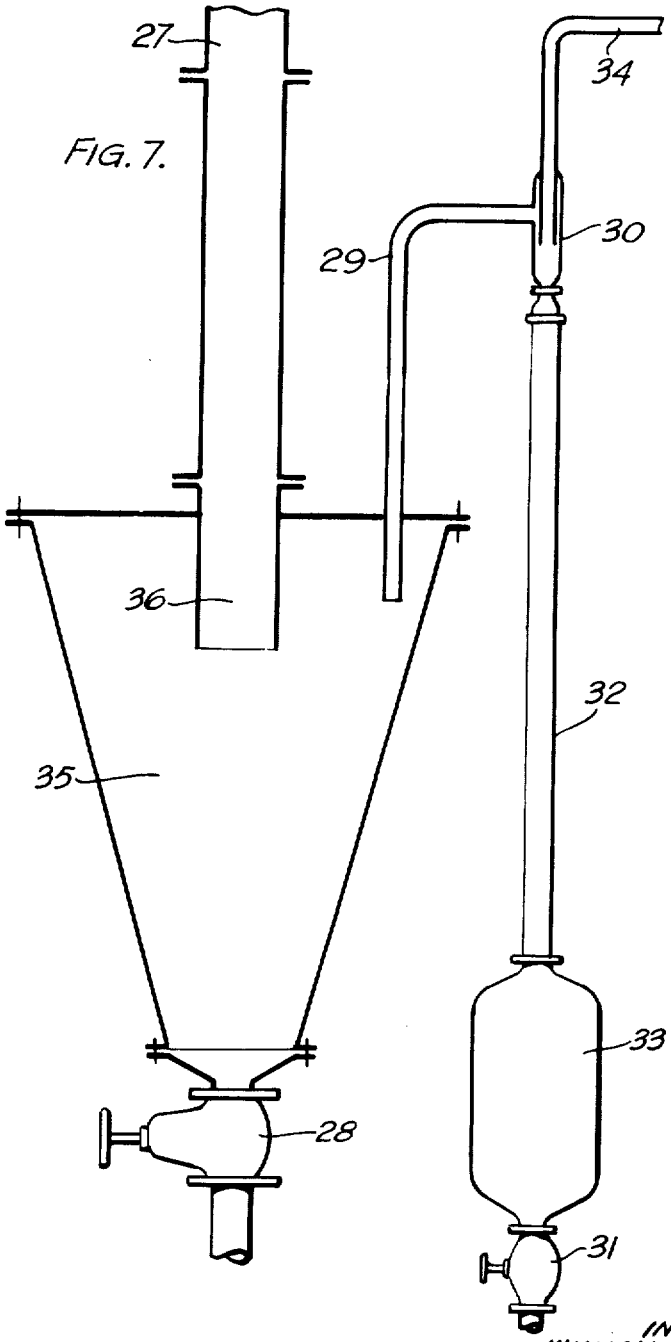
FIGURE 7 is a diagrammatic sectional elevation of apparatus for separating products formed in the apparatus of FIGURE 1.

There is also provided a port 126 in the side wall of the furnace 1 through which the products of reaction are conveyed to ancillary apparatus for cooling and separation. The ancillary apparatus in the form which is shown in FIGURE 7 consists of a conically-shaped receiving vessel 35 into which the products discharged from the port 126 of the furnace are led through a pipe 27 having a centrally-positioned discharge conduit 36. In this vessel, the greater part of the coarse metal oxide agglomerates settle and may be discharged, periodically or continuously according to requirement, through a valve 28, being aided where necessary, by vibratory motion imparted to the sides of receiving vessel 35 by known means. The gases leaving this separator via conduit 29 are conveyed to a cyclone or, if necessary, a series of cyclones as represented by cyclone 30 wherein any of the finer agglomerates of metal oxide produced may be separated from the gas stream, which is led off through ducting 34. The finer material descends through a pipe 32, is collected in a collector 33 below the cyclone, and is discharged through valve 31, either periodically or continuously according to requirement. The gases after being stripped of their solid content and usually containing chlorine as the main constituent, may be re-used directly for chlorination of metalliferous material, as, for example in the case of titanium, ilmenite or rutile and in the case of silicon, ferrosilicon, or silica, or they may be passed to conventional equipment for the removal of the chlorine constituent either by cooling, compression and liquefaction of the chlorine constituent or by absorption of the cooled gases in sulphur chloride or other suitable absorbent from which they may be regenerated by conventional means.

Solid material discharged from the base of separator 35 via valve 28 or from cyclone 30 via valve 31, is collected for subsequent removal of the absorbed chlorine-containing gases.

Reverting to FIGURE 1, at a point towards its base, the furnace 1 is provided in the interior of the furnace with a conduit 77, which is fabricated in refractory chlorine-resistant brick, and inclined at an angle of about 45° to the vertical. The conduit 77 may either be sealed, or, if it is desired to introduce solid bed material and withdraw surplus material during operation of the apparatus, the lower (and outer) end of this conduit is connected by means of flanged joint 78 to a side arm 170 of a vertical pipe 79 3" in internal diameter, sealed into a flanged lid 80 of a mild steel vessel 81, of diameter 8" and height 2 ft., the pipe 79 projecting downwards within the vessel 81 to a point approximately 3" above the top of its tapered base. Just beneath the lower extremity of pipe 79, a stainless steel disc 82, ½ inch thick, is affixed to the sides of vessel 81, said disc being perforated with holes of diameter 1/16" arranged in a square pattern of side length 2". At a point approximately 6" from the sealed top, vessel 81 is provided with a pipe 83, which serves as a means of overflow. At the top of vessel 81 is a small outlet port 84 through which the fluidizing gases can be voided to atmosphere. Through the lower extremity of its tapered base, vessel 81 is fitted with flanged pipe 85, connected with a source of compressed air. The part of the vessel 81 above the perforated disc 82 is encased in a steel jacket of conventional design 86, through which a stream of cold water can be continuously passed to cool the vessel.

Figure 8:
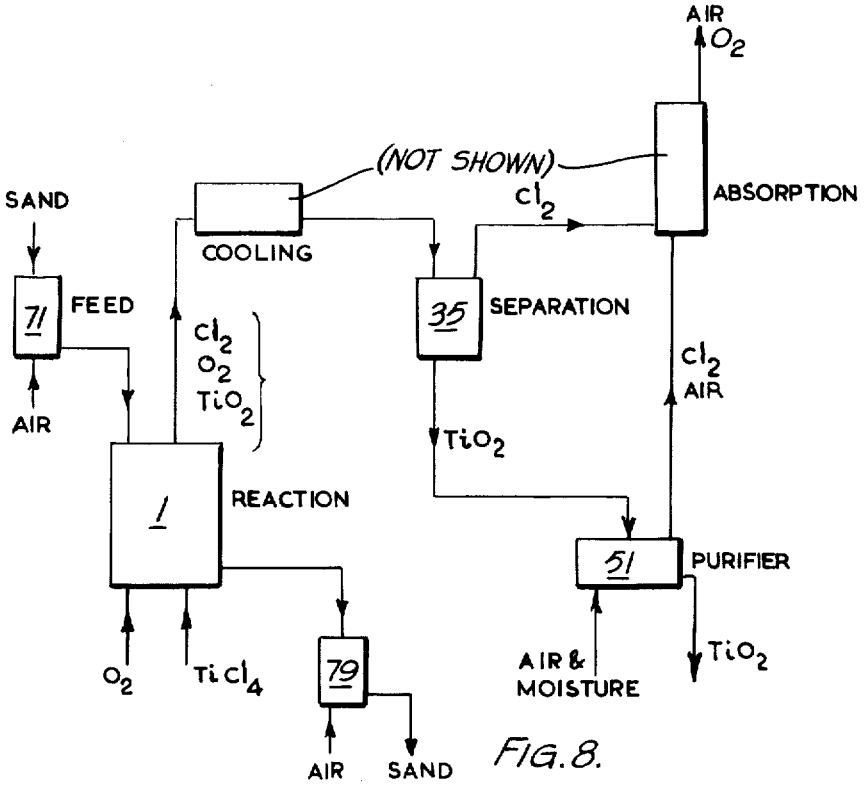
FIGURE 8 is a flow diagram illustrating the complete process operation as applied to the production of titanium dioxide by the oxidation of titanium tetrachloride.

A flow diagram is given in FIGURE 8 of the drawings to show how these various treatment steps may be correlated into a unitary process for titanium dioxide formation it being understood that any individual treatment step diagrammatically illustrated in the flow diagram may be of the character illustrated above for FIGURES 1 to 7 or may take other forms. As illustrated, the bed material with or without pretreatment is fed continuously into the reaction zone into which the reactants are introduced. If the bed material is not fed continuously, it may be purged of accumulated metal oxide from time to time and replaced.

The product gases from the reaction zone entrain the metal oxide and may be cooled and then separated. The metal oxide product thus separated is purified by removal of chlorine, and may then be sent to a grinding or dressing operation and then to storage.

The flow diagram in FIGURE 8 thus illustrates a variety of mutually cooperating steps in processes for producing the desired oxide.

The following examples are given for the purpose of illustrating the invention; all flow rates of gas are calculated on the basis of atmospheric conditions of temperature and pressure.

EXAMPLE 1

The reactor consisted of a vertical steel shaft furnace 1, substantially as illustrated in FIGURE 1, having an overall height of aproximately 13 feet. The furnace 1 was lined internally with chlorine-resistance brickwork 2 of a thickness of 12 inches. This brickwork was supported by 6 inches of outer insulating brickwork 3 and the whole was contained within a steel shell 5 with openings top 6 and bottom 7 corresponding to the vertical shaft (see FIGURE 1). The diameter of the shaft was 24 inches.

The opening 7 at the bottom of the furnace 1 was sealed by a perforated plate 10 surmounted by a layer 11 of chlorine-resistance concrete 9 inches thick, both the plate 10 and the concrete layer 11 immediately above it having 19 passages (1.7/16" diameter) evenly distributed as shown planwise in FIGURE 6. On the under side of the plate 10 ducting and manifolds were installed as described hereinbefore with reference to FIGURES 1 and 3, as modified for application to the distribution of passages shown in FIGURE 6. Thus the conduits corresponding to the two outer lines containing three and the central line of five passages were connected to one manifold for supply and distribution of oxygen or air to the furnace, and the ductings corresponding to the two inner lines of four perforations were connected to a separate manifold to supply the titanium tetrachloride vapor, as shown by the arrows in FIGURE 6. The diameter of the constrictions in the inlet means for the supply of titanium tetrachloride vapor was 0.24 inch, and for the oxygen supply was 0.16 inch.

The upper part of the shaft was provided at one side near the top with a port 126 of 12 inches diameter to afford the means of egress for the titanium dioxide entrained in the gas stream emerging from the reactor at a temperature of about 900° C. to 1000° C.

The interior of the lower part of the shaft communicated directly via a "take-off" conduit 77 (internal diameter 4 inches) inclined at an angle of about 45° to the vertical to the discharge device 79.

The top of the furnace terminated in a plate 40 carrying a port 24 leading to a flanged conduit 70, and served the dual purpose for introducing a gas poker in order to pre-heat the bed and subsequently for admission of material constituting the bed to be fluidized, by attachment of the feed device 71 to the flange.

The plant was operated under the following conditions: zircon sand of average diameter 150 microns was fed to a static depth of approximately 3 feet into the reactor 1. This bed was fluidized by means of air fed via both the manifolds and ductings provided for the oxygen and titanium tetrachloride. By insertion of a pre-ignited gas poker through the port 24 in the top of the furnace, the bed was pre-heated to a temperature of 1100° C. At this stage, the gas poker was removed and the unit 71 connected. Meanwhile, the air by which the bed was initially fluidized was replaced in the oxygen supply manifold by oxygen supplied at a rate of 33 cu. ft. per min. measured at atmospheric temperatures and pressure, while, for the purpose of displacing air from the whole of the titanium tetrachloride inlet means, nitrogen was passed through the other manifold which connected with the two inner lines of four passages in the plate, until the displacement was complete, when the supply of nitrogen was discontinued, and titanium tetrachloride was thereupon admitted to the appropriate passages and thus introduced into the bed. The titanium tetrachloride so introduced was metered at the rate of 11 lbs. per minute into a steam-jacketed vaporizing tube, wherein it was completely vaporized, before entering the manifold and thereafter being admitted into the fluidized bed reaction zone. The titanium tetrachloride reacted with the oxygen in the bed [if] *of* zircon sand thereby fluidized and the products of reaction emerged upward from the bed in the form of a suspension of finely divided titanium oxide in chlorine, and passed through the gas outlet 126. The gases were subsequently led to conventional cooling and separation devices whereby the titanium dioxide produced was collected.

The temperature is the bed constituting the reaction zone was maintained throughout at about 980° C. This was effected by preventing overheating, i.e. by feeding zircon sand via the feed device 71 at the rate of about 40 lbs. per hour and collecting the consequential overflow from the bed via conduit 77 into the fluidized bed collecting device 79 where it was suitably cooled and dechlorinated prior to discharge via conduit 83.

The titanium dioxide product collected was treated to remove adsorbed chlorine gases and was thereafter found to be a finely divided pigment of excellent whiteness and had a tinting strength as measured on the Reynolds scale of 1300.

It is preferred to operate the process using titanium tetrachloride as starting material and so producing titanium dioxide, but it is possible to operate with other metal [halides] *chlorides* to form the appropriate metal oxides, more particularly when (a) the [halide] *chloride* has a conveniently low boiling or sublimination temperature, the temperature limit contemplated being of the order of 350° C., and preferably below 250° C., (b) the oxide had a conveniently high melting and/or decomposition point, desirably about 1200° C., and (c) the oxidation reaction is exothermic at the temperature range contemplated. This silicon tetrachloride and aluminium trichloride can readily be oxidized according to the process of the invention, and zirconium and hafnium [halides] *chlorides* are also contemplated.

EXAMPLE 2

The reactor consisted of a vertical shaft furnace 1 substantially as illustrated in FIGURE 1 and having an internal diameter of 15 inches and an overall height of 7 feet. It was lined with chlorine-resistant brickwork 2 of thickness 9 inches, and insulated by brickwork 3 of thickness 3 inches on the outside, the whole being contained within a steel shell 5 with openings 6 and 7 corresponding to the vertical shaft.

The opening 7 at the base was sealed by an apertured plate 10 substantially as illustrated in FIGURE 1, supporting a block of chlorine-resistant concrete of thickness 9 inches and having seventeen passages 12 uniformly spaced as shown in plan in FIGURE 2, corresponding to seventeen apertures 13 in the plate 10. On the under side of the plate 10 ducting and manifolds were installed as hereinbefore described with reference to FIGURES 1 and 3. The silicon tetrachloride vapor constrictions in the inlet means were of diameter 3/32 inch, whereas the oxygen constrictions were of diameter 1/16 inch.

The top 6 of the furnace 1 was sealed with an insulated plate 40 of thickness 6 inches carrying a port 24, serving as a feed inlet for the substrate material comprising the bed to be fluidized, and also serving for the insertion of a gas poker for preheating the bed; a second port 126 in the wall of the furnace served for conducting the products of reaction from the furnace.

The inclined conduit 77 was in this case sealed at its flange.

In the operation of this plant, silica sand of average diameter of 250 microns was fed into the reactor in such quantity that the depth of bed when fluidized was about 36 inches.

The sand was fluidized by air fed via the manifold system to all seventeen passages. By insertion of a pre-ignited gas poker through the port 24, the bed was preheated to a temperature of 1250° C. At this stage, the gas poker was removed and the port 24 was sealed. Meanwhile, the air supply was substituted by an oxygen supply through the manifold 25 leading to the central passage and the outer ring of passages at the rate of 155 litres per minute and, as a precaution, nitrogen was fed through the manifold 26 leading to the eight inner passages (through which the silicon tetrachloride is intended to flow) in order to free the whole of the inlet means from oxygen and oxygen-containing gases. The nitrogen stream was then arrested and replaced by silicon tetrachloride, to be led into the already fluidized bed. Liquid silicon tetrachloride was measured at the rate of 375 cc. per minute into a steam-jacketed vaporizing tube wherein it was converted completely to gaseous form and was thereafter led into the fluidized bed reaction zone in the aforementioned manner. The molar ratio of silicon tetrachloride to oxygen was 1:2 and, although this was maintained, there were minor adjustments in the feed rate of the reactants to maintain the temperature at 1000–1050° C., within the period of operation, i.e. 5 hours. The silicon tetrachloride reacted with the oxygen within the bed to produce chlorine and silicon dioxide, the latter being removed from the bed through port 126 in an entrained stream which was conveyed through cooling and separation units, whereby the silicon dioxide was collected and the chlorine subsequently absorbed in sulphur chloride for regeneration.

The silicon dioxide product had a particle size of about 0.002 micron.

EXAMPLE 3

The apparatus and procedure used were substantially the same as have already been described in Example 1 with similar gas distribution, bed conditions, and initial bed temperature. Oxygen was supplied through the manifold 25 at 27 cu. ft. per minute. After purging the manifold 26 with nitrogen, vaporized aluminium trichloride was admitted thereto and thus introduced into the bed. The aluminium trichloride so introduced was metered at a rate of 8.3 lbs./minute. The aluminium trichloride reacted with the oxygen in the bed of zircon sand thereby fluidized and the products of the reaction emerged upward from the bed in the form of finely-divided aluminium oxide in chlorine and passed through the gas outlet 126. The gases were subsequently led to conventional cooling and separating devices whereby the aluminium oxide produced was collected.

The temperature in the bed constituting the reaction zone was maintained throughout at about 1000° C. This was effected by feeding zircon sand via the feed device 71 at the rate of about 210 lbs. per hour and collecting the consequential overflow from the bed via conduit 77 into the fluidized bed collecting device 79 where it was suitably cooled and de-chlorinated prior to discharge via conduit 83.

The aluminium oxide product collected was treated to remove adsorbed chlorine gases and was thereafter found to be a finely-divided powder of substantially uniform particle diameter averaging 0.07 micron.

Although the present invention has been described with reference to specific details of certain embodiments thereof, it is not intended that such details shall be regarded as limitations upon the scope of the invention except insofar as they are included in the accompanying claims.

What is claimed is:

1. Apparatus for producing a metal oxide, comprising a shaft furnace, a heat-insulating base for supporting a bed of inert solid material particles to be fluidized, a plurality of gas passageways through the base distributed over the cross sectional area thereof, constructions in said passageways in their lower part, means serving to make a common supply of oxygen available to a first set comprising a plurality of the passageways through the constrictions therein, means serving to make a common supply of [metal halide] *chloride vapor of a metal of the group consisting of titanium, silicon and aluminium* available to a second set comprising a plurality of passageways through the constrictions therein, the sets of passageways being relatively dispersed with first set passageways being located both inwardly of and outwardly of second set passageways radially with respect to the shaft furnace to ensure that the oxygen and metal [halide] *chloride* vapor will intermingle in the fluidized bed, and means for maintaining the depth of the bed of inert solid material particles to be fluidized low enough so that the pressure drop of the metal [halide] *chloride* and oxygen streams as they pass through said constrictions and into the bed is at least one-half the pressure drop across the bed.

2. In a method of preparing metal oxide by establishing a fluidized bed of solids and introducing a [halide] *chloride* of a metal of the group consisting of titanium, silicon and aluminum which is in vapor state at 350° C. and oxygen into the bed and carrying away at least a portion of the metal oxide with the gases leaving the bed, the improvement which comprises introducing the metal [halide] *chloride* into a lower portion of the bed in a multiplicity of dispersed streams and introducing the oxygen into a lower portion of the bed in a multiplicity of other dispersed streams which are interspersed with the dispersed metal [halide] *chloride* streams, the streams entering the bed around the perimeter thereof being streams of oxygen, and maintaining the depth of the bed low enough so that the pressure drop across the conduits is at least one-half the pressure drop across the bed and the ascending streams of metal [halide] *chloride* comingle intimately with the ascending streams of oxygen in the bed within the perimeter thereof.

3. A process for producing oxides which comprises passing upwardly through a fluidized bed of inert solid particles a multiplicity of streams of a gas comprising elemental oxygen and a multiplicity of streams consisting essentially of a vaporized [halide] *chloride* of an element of the group consisting of titanium, aluminium, and silicon, maintaining the depth of said bed low enough so that the pressure drop of the streams as they pass into the bed is at least one-half the pressure drop across the bed, and maintaining the temperature of the bed at which oxygen reacts with the [halide] *chloride,* said multiplicity of oxygen streams and said multiplicity of [halide] *chloride* streams being mutually interspersed to ensure intermingling thereof in the bed from substantially immediately adjacent the bed bottom upwardly through the bed, the combined force of the streams substantially uniformly fluidizing the bed.

4. A process for producing oxides which comprises passing upwardly through a fluidized bed of inert solid particles a multiplicity of streams of a gas comprising elemental oxygen and a multiplicity of streams of a vaporized [halide] *chloride* of an element of the group consisting of titanium, aluminium, and silicon, maintaining the depth of said bed low enough so that the pressure drop of the streams as they pass into the bed is at least one-half the pressure drop across the bed, and maintaining the temperature of the bed at which the [halide] *chloride* reacts with oxygen; said multiplicity of oxygen streams and said multiplicity of [halide] *chloride* streams being mutually interspersed to ensure intermingling thereof in the bed from substantially immediately adjacent the bed bottom upwardly through the bed, wherein the combined force of the streams substantially uniformly fluidizes the bed, the streams nearest the periphery of the bed being oxygen streams.

5. In a method of preparing a metal oxide in a fluidized bed comprising inert particles by introduction of a [halide] *chloride* of a metal of the group consisting of titanium, silicon and aluminium and oxygen into the bed maintained at an elevated temperature at which oxygen reacts with said [halide] *chloride,* the steps of externally heat insulating said bed, maintaining the bed of such capacity as to retain sufficient heat for the temperature to be substantially autothermally maintained, and maintaining the depth of said bed low enough so that said [halide] *chloride* and oxygen undergo a pressure drop, on being introduced into the bed, at least one-half the pressure drop across the bed.

6. The method according to claim 5 wherein the bed is cylindrical and of a diameter of the order of at least fifteen inches.

7. In a process for producing oxides, passing upwardly through a bed comprising particulate inert material at a temperature for oxide production a first multiplicity of streams of a gas containing free oxygen and a second multiplicity of streams consisting essentially of a vaporized [halide] *chloride* of a metal of the group consisting of titanium, silicon and *aluminium* [aluminum] with said first and second streams being interspersed with each other to ensure intermingling within the bed, forcing the streams upwardly into the bed at such velocities that their combined force uniformly fluidizes the bed, maintaining the depth of the bed low enough so that said streams undergo a pressure drop on being passed into the bed, at least one-half the pressure drop across the bed, and maintaining the bed of such cross section and so insulating the bed against escape of heat as to enable the reaction to continue autothermally.

8. In the method of preparing titanium dioxide by establishing a fluid bed of solids and introducing titanium tetrachloride and oxygen into the bed and carrying at least a portion of the titanium dioxide away with the gases leaving the fluidized bed, the improvement which comprises introducing the oxygen into a lower portion of the bed through a plurality of conduits from a common source and maintaining the depth of the bed low enough so that the pressure drop across the conduit is at least one-half the pressure drop across the bed.

9. In the method of preparing titanium dioxide by establishing a fluid bed of solids and introducing titanium tetrachloride and oxygen into the bed and carrying at least a portion of the titanium dioxide away with the gases leaving the fluidized bed, the improvement which comprises introducing the oxygen and the titanium tetrachloride into a lower portion of the bed through a plurality of conduits from a common source and maintaining the depth of the bed low enough so that the pressure drop across the conduit is at least one-half the pressure drop across the bed.

10. The process of claim 9 wherein the depth of the bed is not in excess of 2.5 feet.

11. The process of claim 9 wherein the depth of the bed is not in excess of 2.5 feet and the diameter of the bed is in excess of 1.5 feet.

[12. In the method of preparing titanium dioxide by establishing a fluid bed of solids, introducing titanium tetrahalide and oxygen into the bed and carrying at least a portion of the titanium dioxide away with the gases leaving the fluidized bed, the improvement which comprises introducing the tetrahalide into a lower portion of the bed through a plurality of conduits from a common source and maintaining the depth of the bed low enough so that the pressure drop across the conduit is at least one-half the pressure drop across the bed.]

13. In the method of preparing titanium dioxide by establishing a fluid bed of solids and introducing titanium tetrachloride and oxygen into the bed and carrying at least a portion of the titanium dioxide away with the gases leaving the fluidized bed, the improvement which comprises introducing the tetrachloride into a lower portion of the bed through a plurality of conduits from a common source and maintaining the depth of the bed low enough so that the pressure drop across the conduit is at least one-half the pressure drop across the bed.

14. In the method of preparing titanium dioxide by establishing a fluid bed of solids, introducing titanium [tetrahalide] *tetrachloride* and oxygen into the bed, and carrying at least a portion of the titanium dioxide away with the gases leaving the fluidized bed, the improvement which comprises introducing a member of the group consisting of titanium [tetrahalide] *tetrachloride,* oxygen, and a mixture of titanium [tetrahalide] *tetrachloride* and oxygen, into a lower portion of the bed through a plurality of conduits from a common source of said member, and maintaining the depth of the bed low enough so that the pressure drop across the conduits approximates the pressure drop across the bed.

15. In the method of preparing a metal oxide by establishing a fluid bed of solids and introducing oxygen and a chloride of a metal of the group consisting of titanium, silicon, and aluminium into the bed and carrying at least a portion of the metal oxide away with the gases leaving the fluidized bed, the improvement which comprises introducing the oxygen and the chloride into a lower portion of the bed through a plurality of conduits from a common source and maintaining the depth of the bed low enough so that the pressure drop across the conduit is at least one-half the pressure drop across the bed.

16. In the method of preparing a metal oxide by establishing a fluid bed of solids, introducing oxygen and a [halide] *chloride* of a metal of the group consisting of titanium, silicon, and aluminium into the bed, and carrying at least a portion of the metal oxide away with the gases leaving the fluidized bed, the improvement which comprises introducing into a lower portion of the bed through a plurality of conduits from a common source a member of the group consisting of a [halide] *chloride,* oxygen, and a mixture of the [halide] *chloride* and oxygen, said [halide] *chloride* being a [halide] *chloride* of a metal of the group consisting of titanium, silicon, and aluminium, and maintaining the depth of the bed low enough so that the pressure drop across the conduit approximates the pressure drop across the bed.

17. The method of claim 16 in which the [halide] *chloride* is an aluminium [halide] *chloride*.

18. The method of claim 16 in which the [halide] *chloride* is a silicon [halide] *chloride*.

References Cited by the Examiner

UNITED STATES PATENTS

| | | | |
|---|---|---|---|
| 468,216 | 2/92 | Birge | 23—284 |
| 2,028,326 | 1/36 | Hanks et al. | |
| 2,468,508 | 4/49 | Munday. | |

| | | | |
|---|---|---|---|
| 2,622,969 | 12/52 | Deanesly et al. | 23—284 |
| 2,676,998 | 4/54 | Kuntz et al. | 23—288.35 |
| 2,701,179 | 2/55 | McKinney | 23—284 X |
| 2,760,846 | 8/56 | Richmond et al. | |
| 2,791,490 | 5/57 | Wilcox | 23—284 X |
| 2,828,187 | 3/58 | Evans et al. | |
| 2,841,476 | 7/58 | Dalton | 23—288.35 |
| 2,855,273 | 10/58 | Evans et al. | |

FOREIGN PATENTS

| | | |
|---|---|---|
| 661,685 | 11/51 | Great Britain. |

MAURICE A. BRINDISI, *Primary Examiner.*